Sept. 16, 1952   R. P. BAGDIGIAN   2,610,684
MULTIPLE DIE CUTTER

Filed Jan. 9, 1951   4 Sheets-Sheet 1

Ralph P. Bagdigian
INVENTOR.

BY
*James A. O'Brien*
*and Harvey B. Jacobson*
Attorneys

Sept. 16, 1952  R. P. BAGDIGIAN  2,610,684
MULTIPLE DIE CUTTER

Filed Jan. 9, 1951  4 Sheets-Sheet 2

Ralph P. Bagdigian
INVENTOR.

BY
Attorneys

Sept. 16, 1952  R. P. BAGDIGIAN  2,610,684
MULTIPLE DIE CUTTER

Filed Jan. 9, 1951  4 Sheets-Sheet 3

Ralph P. Bagdigian
INVENTOR.

BY *[signature]*
*Attorneys*

Sept. 16, 1952 R. P. BAGDIGIAN 2,610,684
MULTIPLE DIE CUTTER
Filed Jan. 9, 1951 4 Sheets-Sheet 4

Ralph P. Bagdigian
INVENTOR.

BY

Patented Sept. 16, 1952

2,610,684

UNITED STATES PATENT OFFICE 2,610,684

MULTIPLE DIE CUTTER

Ralph P. Bagdigian, Somerville, Mass.

Application January 9, 1951, Serial No. 205,169

8 Claims. (Cl. 164—23)

This invention relates to new and useful improvements in cutting machines and the primary object of the present invention is to provide a machine for cutting various sizes of greeting cards and the like from sheets of material.

Another important object of the present invention is to provide a multiple die cutter including a reciprocating cutter support having cutter dies thereon that will cut sheets of material to the shape of the dies.

Yet another object of the present invention is to provide a cutting machine that will reduce considerably the time, labor and apparatus required for cutting various sized cards from sheet material.

A further object of the present invention is to provide a multiple die cutter involving a cutter support and a novel and improved actuating mechanism for reciprocating the support relative to a table top on which is placed the material to be cut.

A still further aim of the present invention is to provide a multiple die cutter that is extremely efficient and reliable in operation, strong and durable in use, simple to operate, inexpensive to manufacture, install and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
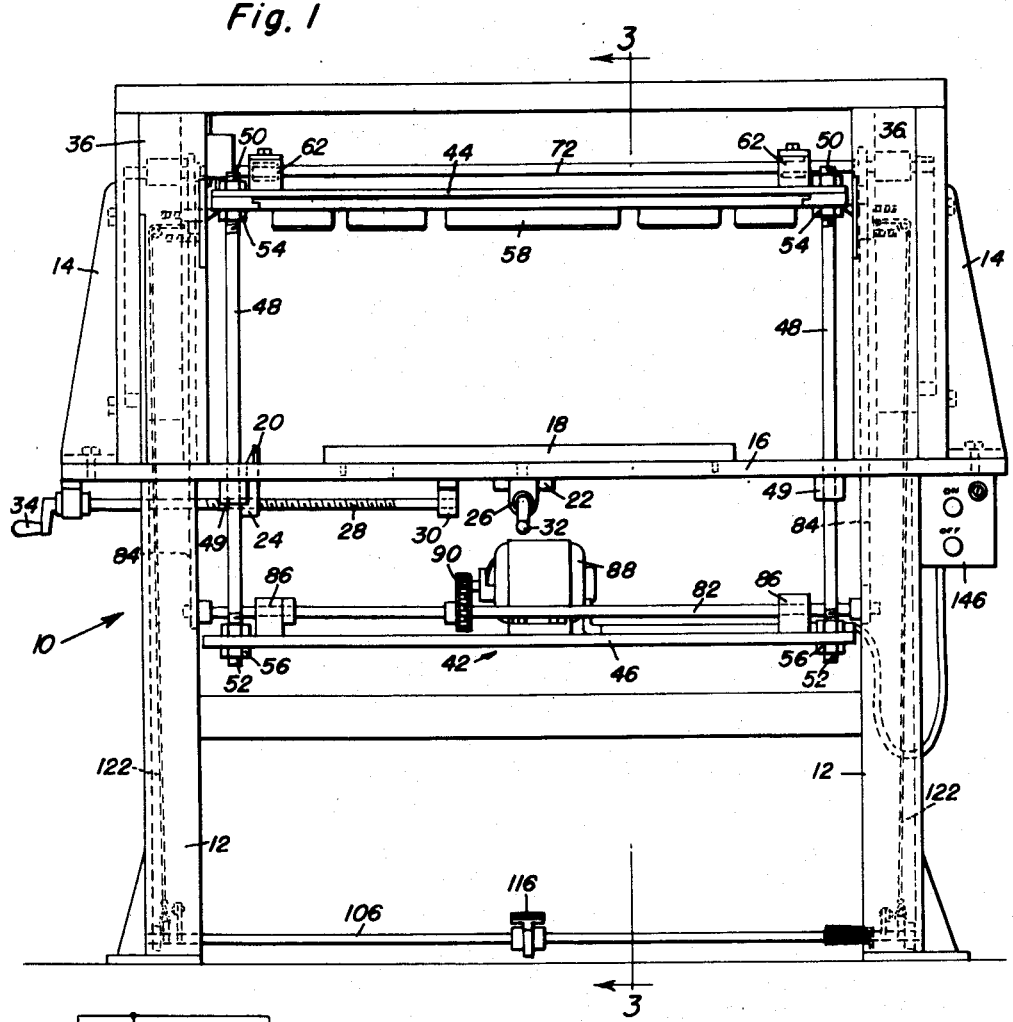
Figure 1 is a front elevational view of the present invention.
Figure 9:
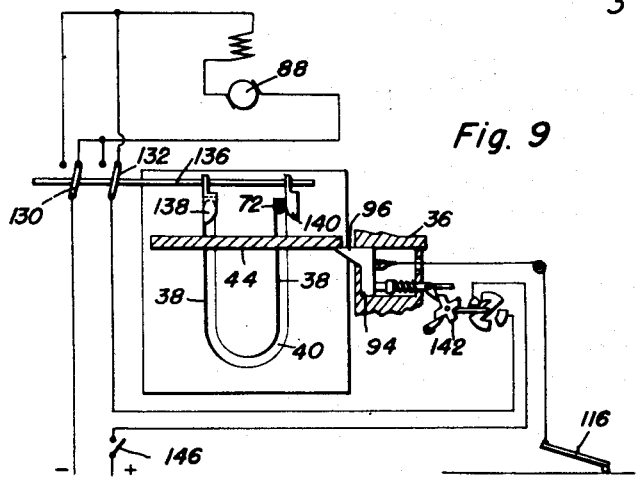
Figure 9 is a diagrammatic view showing the automatic control of the electric motor by the drive shaft for the die plate.
Figure 2:
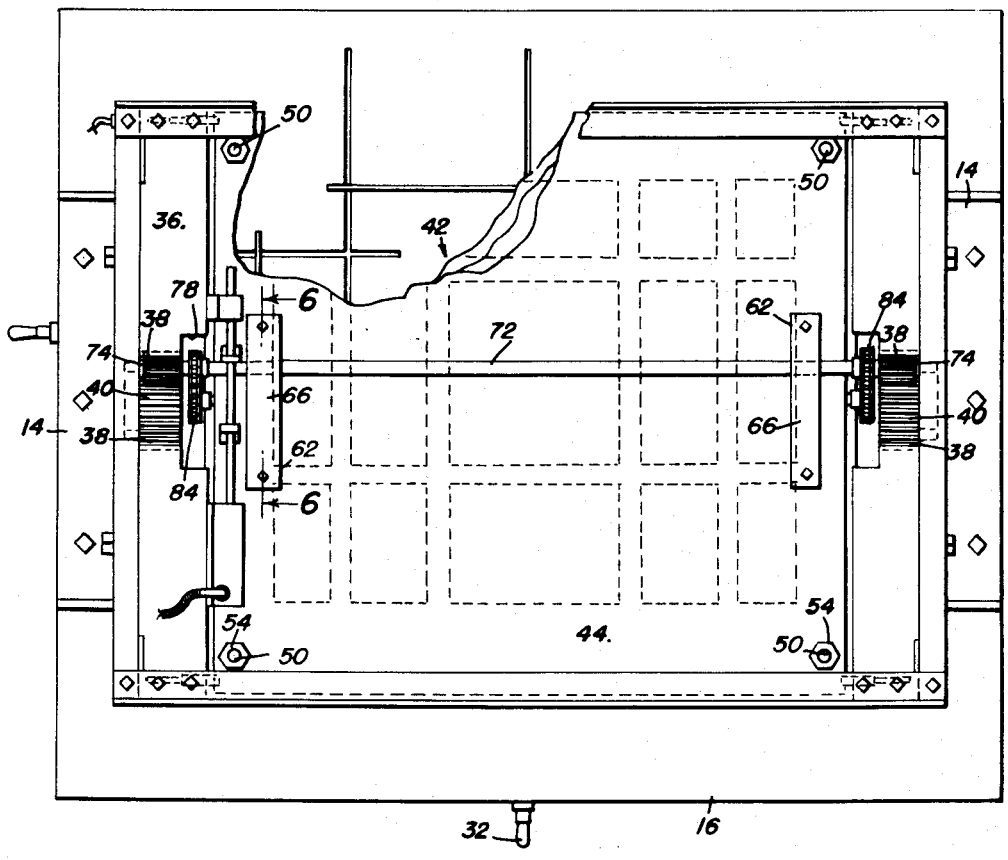
Figure 2 is a top plan view of Figure 1 and with parts broken away and shown in section for the convenience of explanation.
Figure 7:
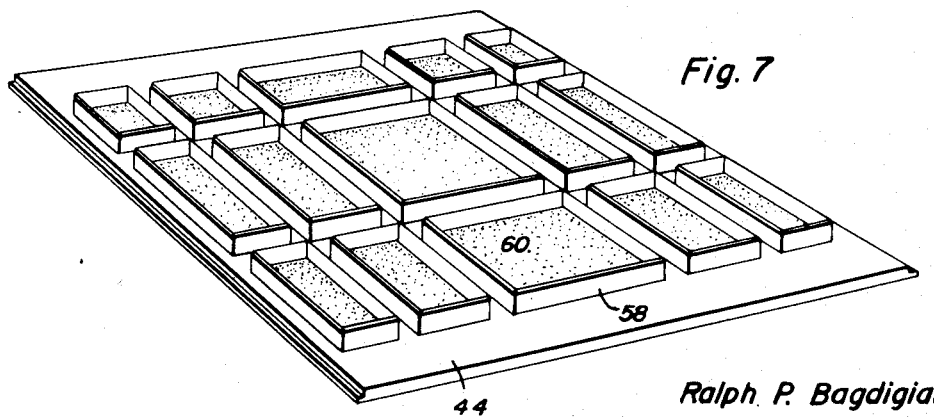
Figure 7 is an inverted perspective view of the cutter supporting panel used in the invention and with the multiple dies thereon.
Figure 3:
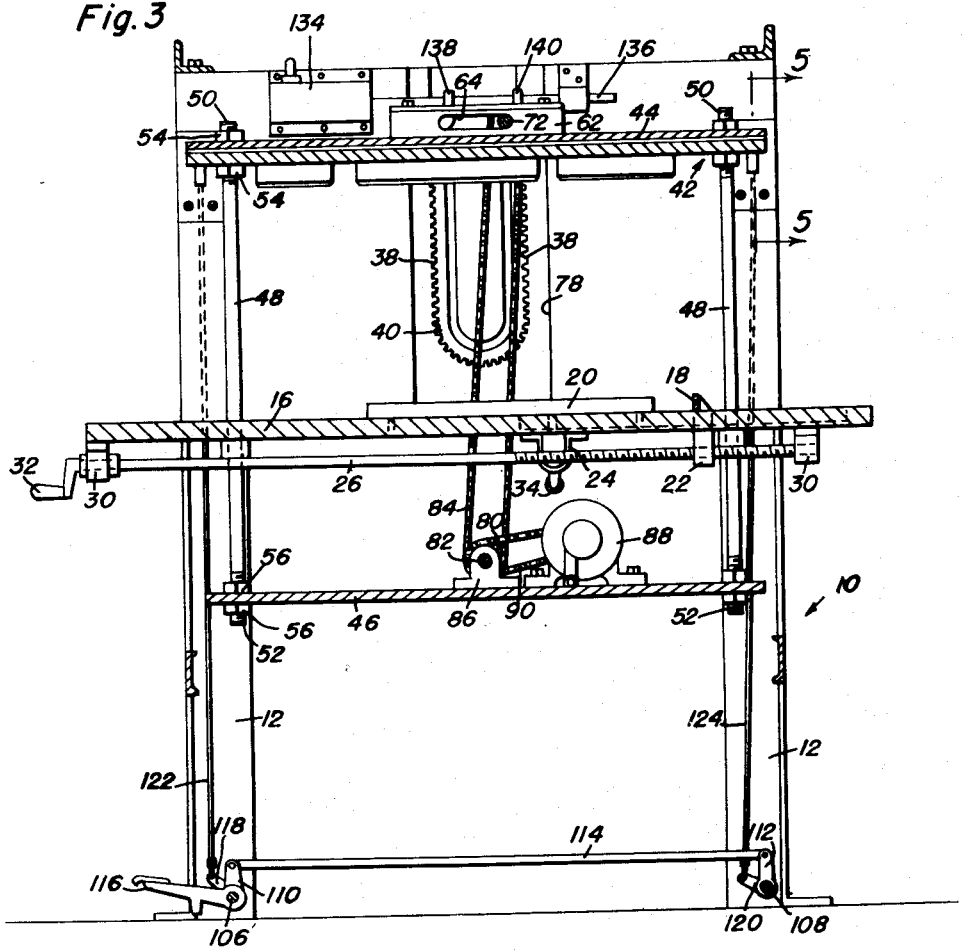
Figure 3 is a vertical sectional view taken substantially on the plane of section line 3—3 of Figure 1.
Figure 5:
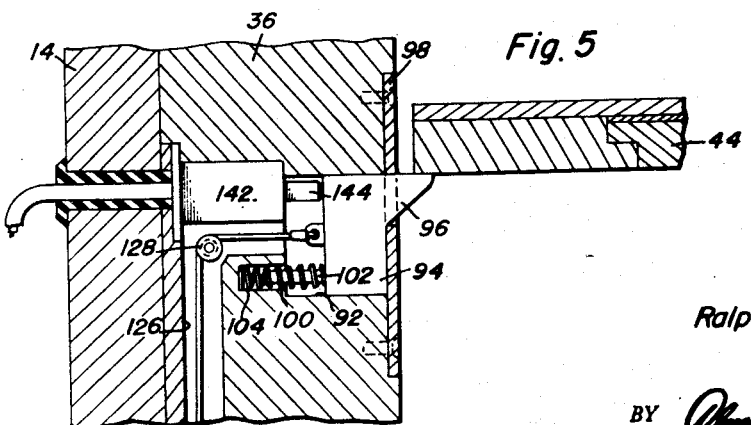
Figure 5 is an enlarged detail vertical sectional view taken substantially on the plane of section line 5—5 of Figure 3.
Figure 4:
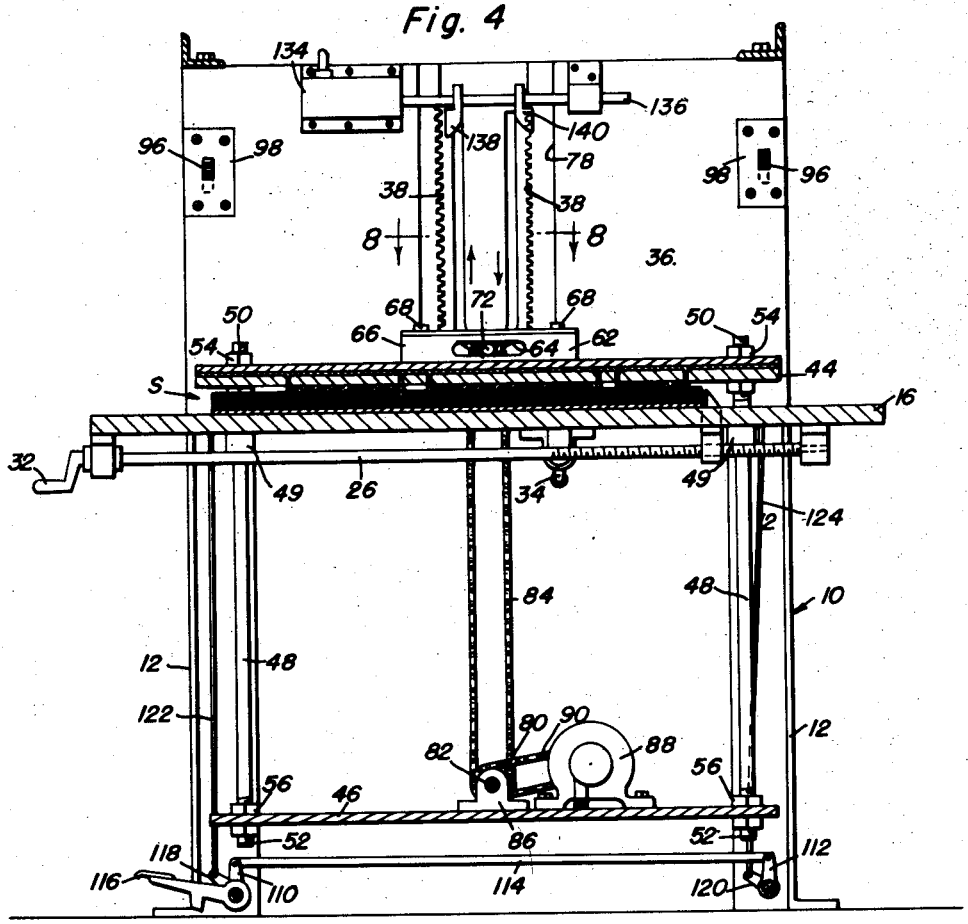
Figure 4 is a view similar to Figure 3 but showing the cutter support in its lowered position.
Figure 6:
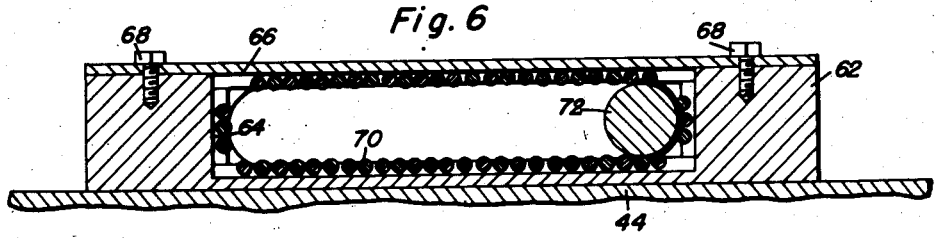
Figure 6 is an enlarged detail vertical sectional view taken substantially on the plane of section line 6—6 of Figure 2.
Figure 8:
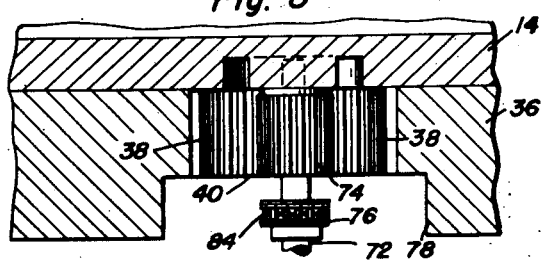
Figure 8 is an enlarged detail horizontal sectional view taken substantially on the plane of section line 8—8 of Figure 4.

Referring now to the drawings in detail, and more particularly to Figures 1-9 inclusive, wherein for the purpose of illustration, there is disclosed one embodiment of the present invention, the numeral 10 represents a frame including supporting legs 12, side walls 14 and a table top 16.

The table top 16 slidably supports a pair of relatively right angular guides or abutments 18 and 20 having depending portions 22 and 24 that are provided with internally threaded horizontal apertures that receivably engage operating screws 26 and 28. The screws 26 and 28 are disposed at right angles to each other and are rotatably supported in a suitable number of bearings 30 on the undersurface of the table top. Crank handles 32 and 34 are attached to one end of the rods whereby the rods may be manually actuated.

Guide means in the form of two blocks 36 are mounted on the frame and rise from the table top. The blocks 36 oppose each other and their inner faces are formed with U-shaped, toothed, guide tracks, each of which includes a pair of toothed vertical portions 38 and a concaved toothed portion 40 joining the lower ends of the vertical portions 38. The operation of this guide means will be set forth in more specific detail as the description proceeds.

A cutter support 42 is employed in conjunction with the frame 10 and comprises a flat horizontal panel 44 that overlies the table top 16, a horizontal platform 46 that underlies the table top 16 and a plurality of vertical bars 48 slidably received in vertical sleeves 49 and whose upper and lower threaded ends 50 and 52 project through apertures in the panel 44 and the platform 46. The upper ends 50 each receive a pair of nuts 54 between which the panel 44 is clamped and the ends 52 each receive a pair of nuts 56 between which the platform 46 is clamped.

A plurality of multi-side open bottomed dies or cutters 58 are suitably secured to the under surface of the panel 44. The dies 58 are of various sizes and/or shapes and the lower edges of their walls are beveled or sharpened to penetrate a material placed on the table top. A resilient, preferably rubber, pad or cushioning element 60 is suitably secured in each die 58 tending to prevent the accumulation of material in the dies.

A pair of bearing units 62 are mounted on the panel 44 and include horizontal slots 64 that are covered by plates 66. The plates 66 are removably secured to the blocks or units 62 by fasteners 68. A plurality of roller bearings 70 are suitably mounted in each of the slots 64 and slidably and rotatably support the ends of a driven shaft 72. Gears 74 are mounted on the ends of the shaft 72 and track along the toothed portions 38, 40 of the U-shaped guide tracks in the blocks 36.

The shaft 72 supports sprockets 76 adjacent the gears 74 that are received in recess 78 in the inner faces of the blocks 36. The sprockets 76 are connected to additional sprockets 80 on the ends of another shaft 82 by sprocket chains 84. Bearings 86 on the platform 46 rotatably support the shaft 82 and an electric motor 88, mounted on the platform 46 is operatively connected to the shaft 82 by a drive connection 90.

The blocks 36 are provided with horizontal recesses 92 in their inner faces that slidably receive latch members 94 having laterally projecting cam surfaced lugs 96. The lugs 96 are urged outwardly through openings in cover plates 98 that are removably secured to the blocks 36, by coil springs 100 that embrace studs 102 carried by the members 94. The springs 100 are received in seats 104 in the inner walls of the recesses 92 to urge the members 94 against the plates 98 and the lugs 96 through the openings in the plates 98.

A pair of spaced parallel rock shafts 106 and 108 are rotatably supported on the frame 10 beneath the platform 46 and support laterally projecting arms 110 and 112 that are connected by a link 114 whose ends are pivoted to the arms to permit simultaneous rotation of the rock shafts as a pedal 116 secured to shaft 106 is depressed.

Additional arms 118 and 120 are fixed to and project laterally from the rock shafts 106 and 108. The lower ends of pairs of cables 122 and 124 are secured to the arms 118, 120 and the upper ends of the cables 122, 124 extend upwardly through passages 126 in the blocks 36, over pulleys 128 mounted in the recesses 92 and are attached to the members 94 so that the lugs 96 may be moved into the recesses 92 as the pedal 116 is pressed downwardly.

As the cutter support 42 is raised, the panel 44 will ride upwardly against the cam surfaced lugs 96 to urge the members 94 well into the recesses 92 until the panel 44 has cleared the lugs 96 whereupon the springs 100 will urge the lugs 96 under the panel 44 to support the panel 44 and the entire cutter support raised until the pedal 116 is depressed.

The motor 88 is of the reversible type and is electrically connected to two switches 130 and 132 in a switch box 134 mounted on one of the blocks 36. The switches 130 and 132 are connected by a horizontally slidable actuator rod 136 that extends across the portions 38 of one guide block 36 and which supports a pair of cams 138 and 140. The rod 136 is shifted by one end of the shaft 72 selectively engaging the cams 138 and 140 to make one of the switches 130, 132 and break the other of the switches.

Another switch 142 is mounted in one of the recesses 92 and includes a spring urged plunger 144 that will be actuated to complete the circuit to the motor as the member 94 in the said one recess 92 is moved by a depression of the pedal 116. A master switch 146 for the motor 88 is mounted on the table top 16.

In practical use of the present invention, the cutter support is normally held raised by the latch members 94 and the circuit to the motor 88 is open. After a stack of paper stock S is placed on the table top 16, the cranks 32 and 34 are adjusted to center the stock S on the table top.

Then, the pedal 116 is depressed and the switch 146 actuated manually, whereupon the latch members 94 release the support 42 and the switch 142 is closed to start the motor 88 and drive the shaft 72. The gears 74 first ride down one of the vertical portions 38 of each U-shaped guide, around the portions 40 and up the other portion 38 of each U-shaped guide track. When the panel 44 is lowered against the stock S the cutters 58 perform their cutting action and the shaft slides across the slots 64 to permit raising of the cutter support.

After the shaft 72 has traveled both vertical portions 38 and the curved portions 40 of each U-shaped guide track, the shaft 72 will engage the cam 138 to shift the rod 136 to close the switch 130, thereby reversing the motor 88 and causing the shaft to retract over the portions 38 and 40. Thus, the cutter support is reciprocated to cut various shapes of cards from the stock S.

Having described the invention, what is claimed as new is:

1. A drive means for a movable panel comprising a frame including a table top, a movable panel slidably carried by said frame for movement toward and away from said table top, a pair of U-shaped guide tracks fixedly mounted on the frame and having toothed surfaces around their whole length, a horizontally slidable shaft rotatably and slidably mounted on said panel, a pair of gears on said shaft engaging said tracks for the entire perimeter of said tracks, and power means on said panel and operatively connected to the shaft.

2. A drive means for a movable panel comprising a frame including a table top, a panel movable toward and away from said table top, a platform and a plurality of hanger rods securing the panel to the platform, said table top slidably receiving said rods, a pair of U-shaped, toothed, guide tracks fixed to and rising from the table top, said tracks being toothed around their entire perimeter, bearings on said panel having horizontal slots therein, a shaft slidably and rotatably mounted in said slots, a pair of gears on said shaft engaging the toothed guide tracks around the entire extent of said tracks, and power means supported on said platform and connected to said shaft.

3. A drive means for a movable panel comprising a frame including a table top, a panel movable toward and away from the table top, a platform and a plurality of hanger rods securing the panel to the platform, said table top slidably receiving said rods, a pair of U-shaped, toothed, guide tracks rising from the table top and being toothed around their entire perimeter, bearings on said panel having horizontal slots therein, a shaft slidably and rotatably mounted in said slots, a pair of gears on said shaft engaging the toothed guide tracks along the entire extent of said tracks, each of said guide tracks including a pair of spaced parallel vertical toothed portions and a concaved toothed portion joining the lower ends of said vertical portions, said slots being sufficiently long as to permit the shaft to shift from one vertical portion of each guide track to the other vertical portion of each guide track as the gears move along the concaved toothed portions of said guide tracks, and power means supported on the platform and operatively connected to said shaft for rotating the shaft.

4. The combination of claim 3 wherein said power means includes a second shaft rotatably mounted on the platform and paralleling the first named shaft, sprockets on said shafts, and an endless sprocket chain joining the sprockets of both shafts, the long axes of said slots paralleling the second shaft and the longitudinal axis of the second shaft lying in a vertical plane passing through the horizontal slots medially the ends of the slots to retain the chain relatively taut throughout raising and lowering of said support.

5. The combination of claim 3 and a pair of cam surfaced latch members slidably carried by said frame for movement toward and away from each other and normally supporting the panel raised from the table top, manually actuated means connected to said latch member for moving the latch members away from the panel to permit lowering of the support, said panel riding against and over the cam surfaced latch members during raising of the support, and spring means urging the latch members toward each other and toward the panel.

6. The combination of claim 5 wherein said power means includes an electric motor, and switch means for the motor actuated by said latch members as the latch members are moved away from the panel to release the latter.

7. The combination of claim 6 wherein said motor is a reversible motor, a reversible switch for the motor, and means on the frame actuated by the first named shaft for activating the reversible switch to permit the first named shaft to move back and forth in the guide tracks.

8. A drive means for a movable platen comprising a frame including a table top, a pair of U-shaped guide tracks mounted on the frame, each of said guide tracks including a pair of vertical toothed portions and a concaved toothed portion joining the lower ends of the vertical portions, a panel overlying the table top, a platform underlying the table top and a plurality of vertical rods slidably carried by the table top and terminally secured to said panel and said platform, a shaft slidable and rotatably mounted on the panel, gears on said shaft engaging said guide tracks throughout the entire extent of said tracks, electrical power means on said platform and connected to said shaft for rotating the latter, latch means carried by said frame engaging the panel to retain the support raised, and means on said frame and connected to said latch means for actuating the latch means to release the panel, and switch means on said frame actuated to a circuit closing position by said latch means, said switch being connected to said electrical power means.

RALPH P. BAGDIGIAN.

REFERENCES CITED

The following references are of record in the file of this patent:

UNITED STATES PATENTS

| Number | Name | Date |
|---|---|---|
| 325,037 | Abbott et al. | Aug. 25, 1885 |
| 558,864 | Van Osta | Apr. 21, 1896 |
| 1,251,740 | Benson | Jan. 1, 1918 |
| 1,379,420 | Sawyer | May 24, 1921 |
| 2,214,665 | Elf | Sept. 10, 1940 |
| 2,259,320 | Novick | Oct. 14, 1941 |